US012247708B2

(12) United States Patent
Shanahan

(10) Patent No.: US 12,247,708 B2
(45) Date of Patent: Mar. 11, 2025

(54) TACTICAL CHEMICAL LIGHT STICK DISPENSER

(71) Applicant: Christopher Reid Shanahan, Southern Pines, NC (US)

(72) Inventor: Christopher Reid Shanahan, Southern Pines, NC (US)

(73) Assignee: CAROLINA CLOVIS LLC, Southern Pines, NC (US)

( * ) Notice: Subject to any disclaimer, the term of this patent is extended or adjusted under 35 U.S.C. 154(b) by 239 days.

(21) Appl. No.: 18/159,926

(22) Filed: Jan. 26, 2023

(65) Prior Publication Data

US 2023/0304638 A1 Sep. 28, 2023

Related U.S. Application Data

(60) Provisional application No. 63/303,300, filed on Jan. 26, 2022.

(51) Int. Cl.
*B65D 83/02* (2006.01)
*F21K 2/06* (2006.01)

(52) U.S. Cl.
CPC ................ *F21K 2/06* (2013.01); *B65D 83/02* (2013.01)

(58) Field of Classification Search
CPC .................................. F21K 2/06; B65D 83/02
USPC .......................................................... 221/270
See application file for complete search history.

(56) References Cited

U.S. PATENT DOCUMENTS

| | | | | |
|---|---|---|---|---|
| 909,110 | A | 1/1908 | O'Neil | |
| 1,701,709 | A | 6/1928 | Ostrander | |
| 2,141,684 | A | 12/1938 | Diemer | |
| 2,833,028 | A | 5/1958 | Treimann | |
| 2,973,882 | A | 3/1961 | Jeffus | |
| 3,393,831 | A | 7/1968 | Stewart | |
| 3,397,818 | A | 8/1968 | Rey | |
| 4,442,962 | A | 4/1984 | Musgrave | |
| 4,779,759 | A | 10/1988 | Seavey | |
| 5,131,562 | A | 7/1992 | Brown | |
| 5,319,872 | A | 6/1994 | Bammate | |
| 5,328,052 | A | 7/1994 | Kizilos | |
| 5,547,336 | A | 8/1996 | Whiteman | |
| 6,378,729 | B1 | 4/2002 | Kodama | |
| 6,418,701 | B1 | 7/2002 | Navarro | |
| 6,786,357 | B2 | 9/2004 | Renard | |
| 6,810,616 | B2 | 11/2004 | Tal | |
| 7,200,964 | B2 | 4/2007 | Gates | |
| 7,334,701 | B2 | 2/2008 | Chirnomas | |
| 7,677,409 | B2 | 3/2010 | Reynolds | |
| 8,308,026 | B2 | 11/2012 | Rapko | |
| 9,738,433 | B2 | 8/2017 | Hogg | |
| 10,577,197 | B1 * | 3/2020 | Burnsed, Jr. | B65G 59/02 |
| 2003/0066227 | A1 | 4/2003 | Fitzpatrick | |
| 2004/0238557 | A1 | 12/2004 | Chirnomas | |
| 2007/0034640 | A1 | 2/2007 | Casale | |

(Continued)

*Primary Examiner* — Gene O Crawford
*Assistant Examiner* — Ayodeji T Ojofeitimi
(74) *Attorney, Agent, or Firm* — Martin S. High, P.C.

(57) ABSTRACT

A tactical chemical light stick dispenser to provide the ability of a user to quickly and accurately deploy chemical light stick devices from a contained and protected chemical light stick housing device. The tactical chemical light stick dispenser employs 1.5" chemical lights sticks that give off just the right amount of light necessary to effectively mark a room visited or identified without the need for larger chemical light sticks as seen in traditional bundles.

13 Claims, 5 Drawing Sheets

(56) References Cited

U.S. PATENT DOCUMENTS

| | | | | |
|---|---|---|---|---|
| 2010/0072221 | A1 | 3/2010 | Chirnomas | |
| 2012/0175275 | A1* | 7/2012 | Palmer .................. | C09K 11/07 252/700 |
| 2015/0160186 | A1 | 6/2015 | Garner-Richards | |

* cited by examiner

TACTICAL CHEMICAL LIGHT STICK DISPENSER

STATEMENT REGARDING FEDERALLY SPONSORED RESEARCH OR DEVELOPMENT

Not applicable

BACKGROUND OF THE EMBODIMENTS

Field of the Embodiments

The general field of the embodiments of the Tactical Chemical Light Stick Dispenser is the dispensing of chemical lighting devices. More specifically general field of the embodiments of the Tactical Chemical Light Stick Dispenser is dispensing of chemical lighting devices under law enforcement and similar tactical conditions.

Current law enforcement tacticians trained in close quarters use chemical light sticks to mark rooms or spaces as visited or identified as they progress room by room in low-light conditions. Chemical light sticks are used by virtually all law enforcement entities that clear rooms and buildings by force, against known threats. Current conditions call for use of "chemlight bundles." These bundles consist of four to ten 4"-6" chemical light sticks that are tied together and each potentially covered with tape to reduce the light signature. When needed, the user reaches down to the bundle on his kit, grabs one, and pulls/rips it off the bundle loop or string, breaks it with two hands, and drops it on the ground in the identified room.

Chemical light stick bundles are time consuming to create. One bundle can take a few minutes to create. The materials needed include six to eight chemical light sticks, a roll of tape, 12" of parachute cord, and possibly a lighter to burn ends of cord once cut and tied. The bundles leave exposed chemical light sticks dangling from an attachment loop and can inadvertently break when tactician climbs over obstacles. This mistakenly broken chemical light stick then illuminates the individual at night and draws attention from perpetrators. This is unacceptable. The bundles are bulky and 4"-6" light sticks are simply overkill when it comes to simply marking a room visited or identified. When not taped, a fully illuminated 4" chemical light stick can illuminate an entire room and all the officers within. Too much light will cause tacticians to lose the advantage under night vision. Using bundles can take a few seconds too long to rip off a chemical light stick, break it on your leg, and drop it to mark a room visited or identified. In certain tactical situations, seconds matter and lives may be lost because of them.

SUMMARY OF THE EMBODIMENTS

The objective of the embodiments of the Tactical Chemical Light Stick Dispenser is to provide the ability of a user to quickly and accurately deploy chemical light stick devices.

A purpose of the Tactical Chemical Light Stick Dispenser is to eliminate chemical light stick bundles and provide for an efficient means of dispensing chemical light sticks. The Tactical Chemical Light Stick Dispenser uses 1.5" chemical light sticks that give off just the right amount of light necessary to effectively mark a room visited or identified without the need for taping each larger chemical light stick as seen in traditional bundles.

There has thus been outlined, rather broadly, the more important features of the embodiments in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for description and should not be regarded as limiting. As such, those skilled in the art will appreciate that the conception, upon which this disclosure is based, may readily be used as a basis for the designing of other structures, methods, and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE PREFERRED EMBODIMENTS

Figure 1A:
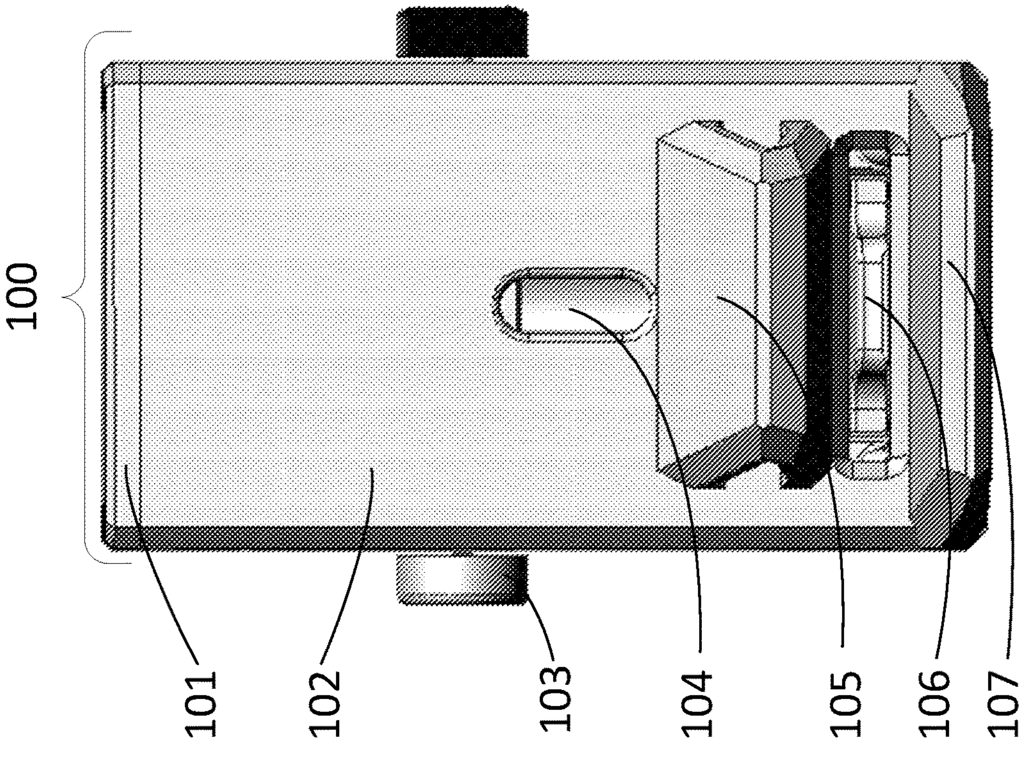
FIG. 1A is a front view of an embodiment of the Tactical Chemical Light Stick Dispenser.
Figure 1B:
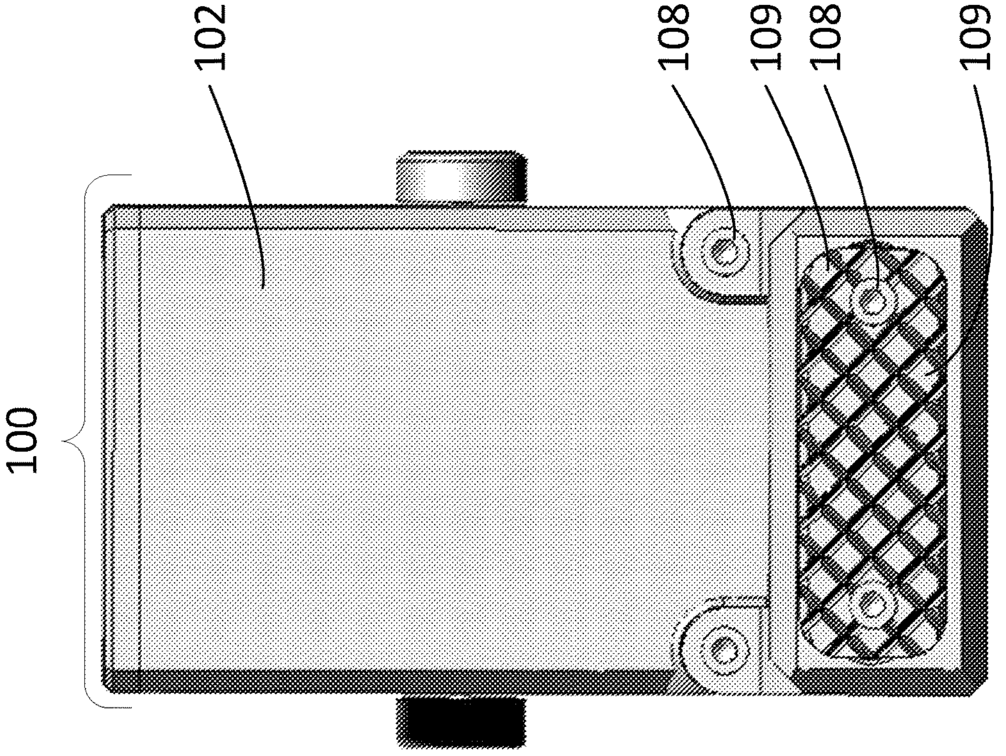
FIG. 1B is a back view of an embodiment of the Tactical Chemical Light Stick Dispenser.
Figure 2A:
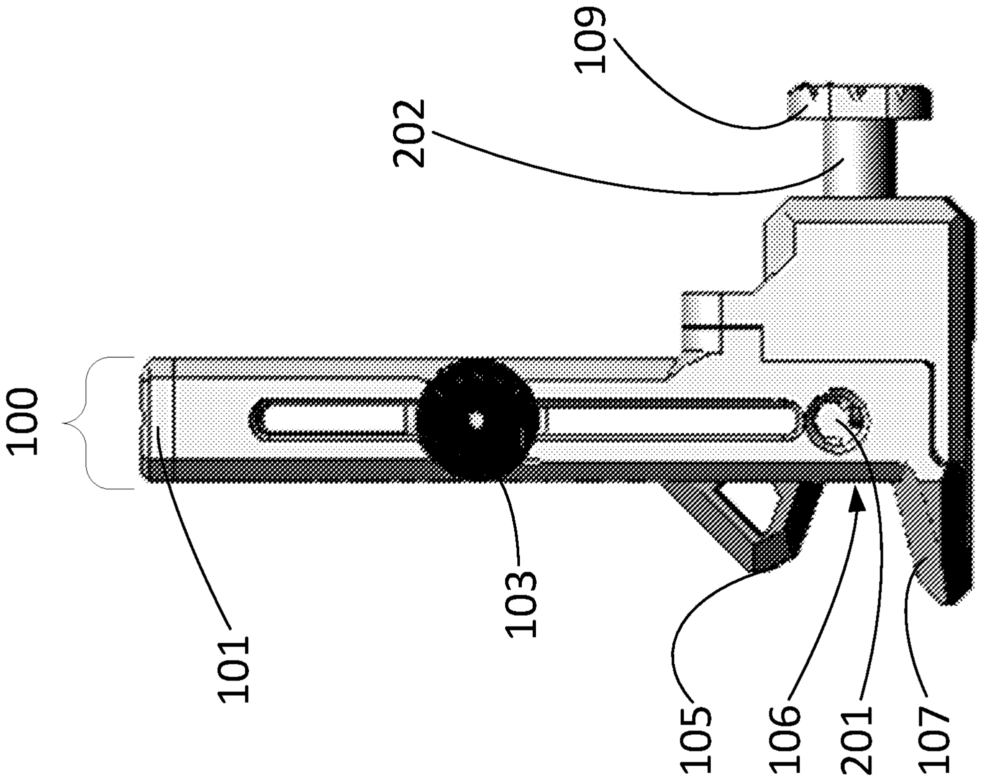
FIG. 2A is a left view of an embodiment of the Tactical Chemical Light Stick Dispenser.
Figure 2B:
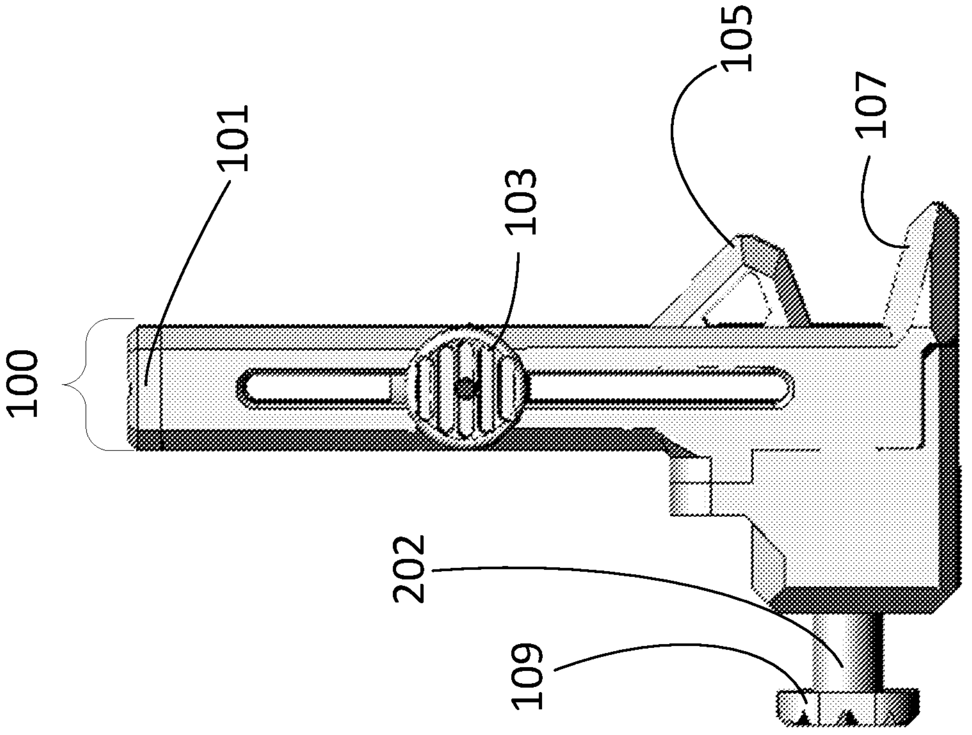
FIG. 2B is a right view of an embodiment of the Tactical Chemical Light Stick Dispenser.
Figure 3B:
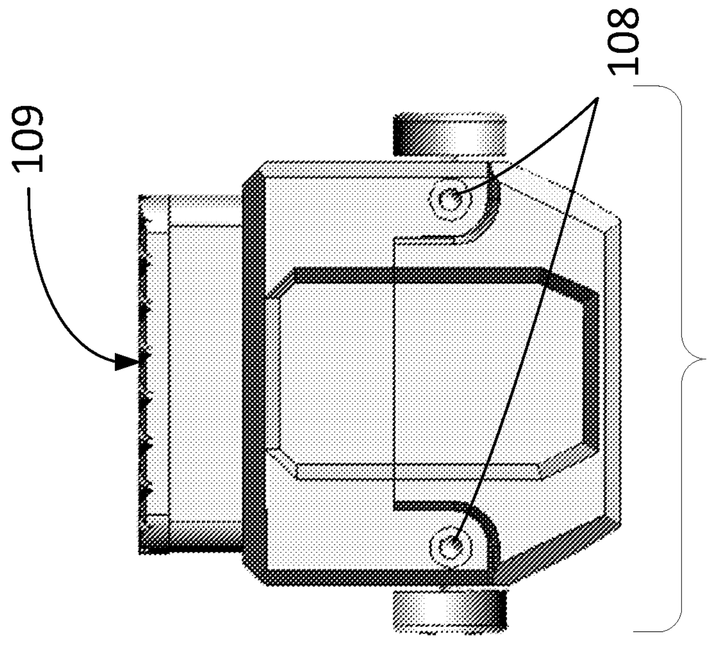
FIG. 3B is a bottom view of an embodiment of the Tactical Chemical Light Stick Dispenser.
Figure 3A:
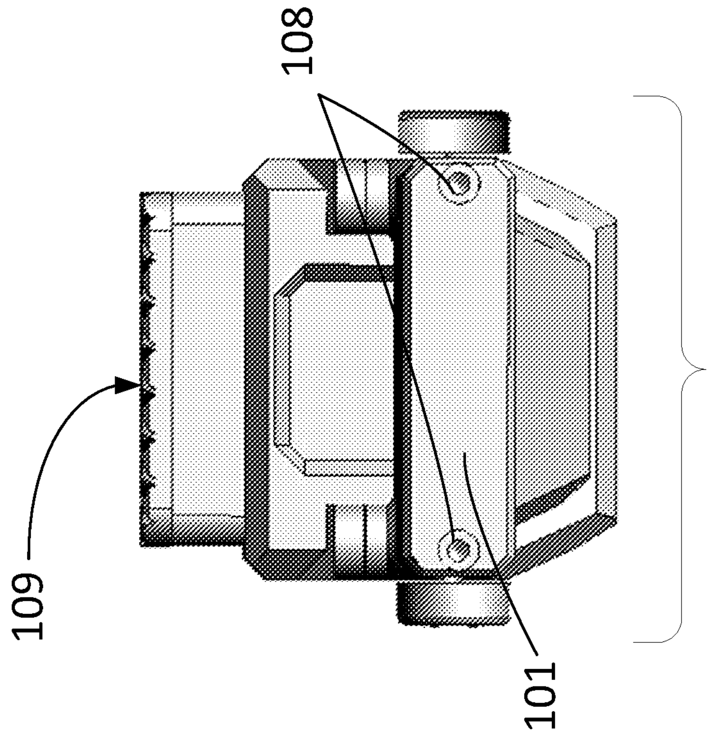
FIG. 3A is a top view of an embodiment of the Tactical Chemical Light Stick Dispenser.
Figure 4:
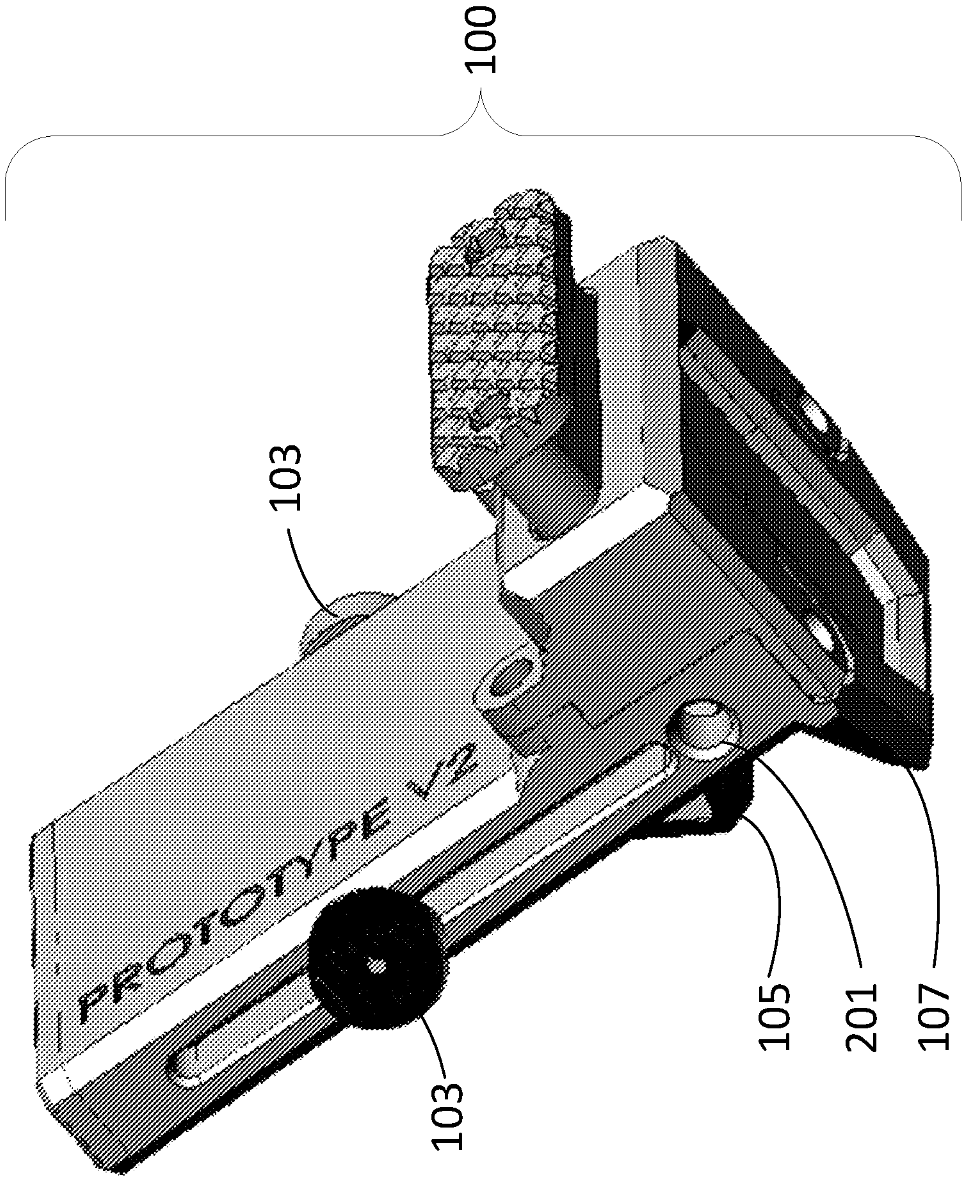
FIG. 4 is a perspective view of an embodiment of the Tactical Chemical Light Stick Dispenser.
Figure 5B:
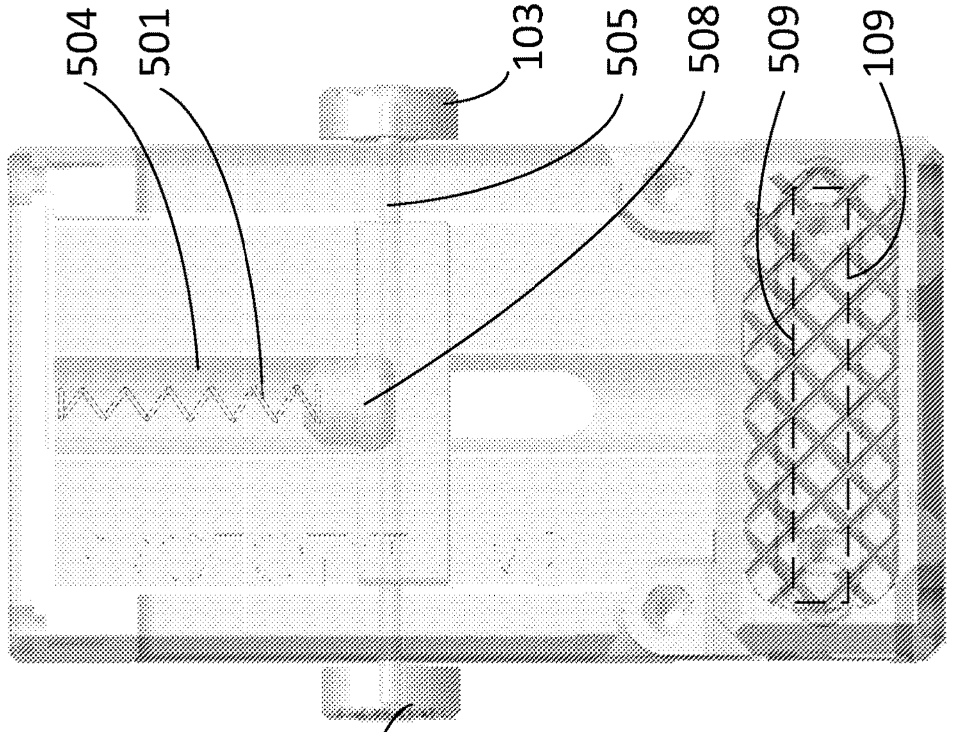
FIG. 5B is a back view of an embodiment of the Tactical Chemical Light Stick Dispenser showing the internal structure.
Figure 5A:
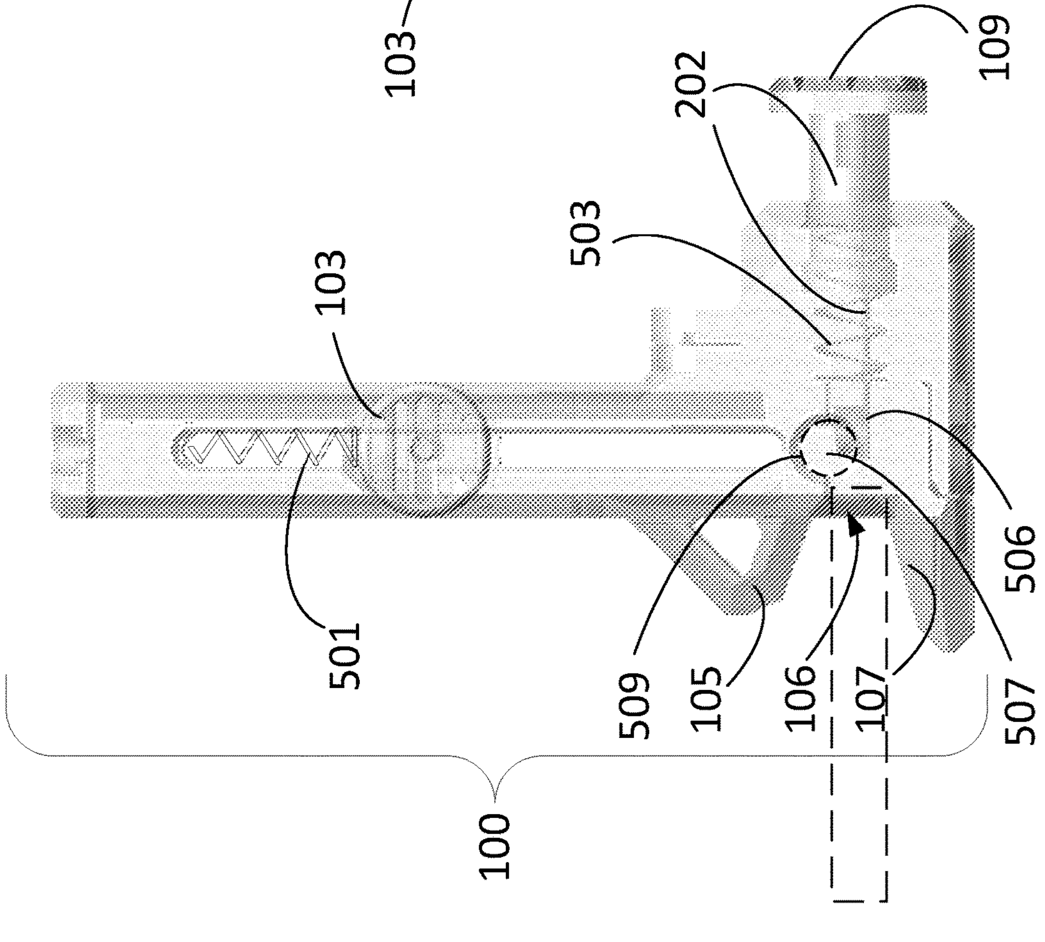
FIG. 5A is a left view of an embodiment of the Tactical Chemical Light Stick Dispenser showing the internal structure.

Embodiments of the Tactical Chemical Light Stick Dispenser 100 (hereinafter "Dispenser") comprises a dispenser housing 102. The dispenser housing 102 comprises a light stick housing cover 101, loading index points 103 that are connected to an assist rod 505, a light stick status window 104, an upper raised finger block 105, a light stick ejection port 106, a lower raised finger block 107, a plurality of screws 108, an actuating button 109, and a chemical light stick housing loading port 201. The actuating button 109 is mechanically connected to two actuating plungers 202 which is in turn mechanically connected to an actuating rod 506. Two actuating rod tension springs 503 maintain pressure against the two actuating plunger 202 outwards from the device and returns the actuating button 109 to the normal ready extended position.

The actuating button 109 is mechanically connected to two actuating plungers 202 located on each side of the actuating button 109. The actuating button 109 connects and transitions into the actuating rod 506. When the actuating button 109 is depressed, the two actuating rod tension springs 503 are compressed and forces the actuating rod 506 towards the bottom most chemical light stick 509 in the dispenser housing. One of each of the two actuating rod tension springs 503 is located on either side of the actuating button 109. Each of the two actuating plungers 202 connects and transitions to the actuating rod 506. The pressure from the actuating button 109, through the actuating rod 506, provides a perpendicular force to the middle of the bottom most chemical light stick 509 resulting in breaking the internal chemical chambers of the bottom most light stick 509 and activating the chemical light stick. The now activated bottom most chemical light stick 509 is ejected through the light stick ejection port 106 and falls away from the Dispenser 100.

The dispenser housing 102 comprises within the dispenser housing 102 a chemical light stick housing vertical spring chamber 504, chemical light stick housing vertical spring 501 a vertical spring follower 508, a chemical light stick housing loading port 201, and a chemical light stick loading assist rod 505. On one side of the dispenser housing 102, the dispenser housing 102 forms a light stick status window 104 that permits viewing of the number of remaining chemical light sticks for activation and ejection.

The chemical light stick housing vertical spring 501 maintains downward pressure on the vertical spring follower 508, which in turn, applies downward pressure on the chemical light sticks in the dispenser. This pressure from the chemical light stick housing vertical spring 501 holds the light sticks in place down the dispenser housing 102 all the way to the light stick ejection chamber 507. When the actuating button 109 is depressed, the inward pressure caused by the actuating rod springs also forces a chemical light stick to bend across the actuating rod 506 causing the chemical light stick to become broken and the chemicals in the light stick to become activated. The actuating button then forces the chemical light stick to eject from the light stick ejection chamber 507 and out through the light stick ejection port 106. The two actuating rod tension springs 503 then return the actuating button 109 back to the original ready position.

The chemical light stick loading assist rod 505 when retracted upward removes the spring force on the chemical light sticks and allows for additional chemical light sticks to be inserted into the dispenser housing through the chemical light stick housing loading port 201.

To use the Dispenser 100, the user retracts the chemical light stick housing vertical spring 501 by applying pressure with thumb and finger on the loading index points 103 placed on the ends of the loading assist rod 505. The user inserts a plurality of chemical light sticks into the chemical light stick housing loading port 201. In one embodiment, the Dispenser 100 can accommodate up to fifty (50) 1.5" chemical light sticks. In another embodiment, the Dispenser 100 can accommodate up to ten (10) 1.5" chemical light sticks. The Dispenser 100 is now loaded and ready for operation.

Next, the user simply applies pressure to the actuating button 109 until the bottom of the button 109 contacts the main body of the Dispenser 100. As this button is fully depressed, the Dispenser 100 bends a single chemical light stick, breaks it, and ejects it from the light stick ejection chamber 507 and out through the light stick ejection port 106. The broken chemical light stick is instantly activated and falls to the ground. When the user releases pressure from the actuating button 109 and allows it to reset to the original position, the chemical light stick housing vertical spring 501, with vertical spring follower 508, applies the necessary downward pressure which pushes and cycles the next chemical light stick into position for subsequent activation and ejection.

The Dispenser 100 is reloadable during non-tactical pauses. The Dispenser 100 with ten to fifty chemical light sticks is less bulky than a bundle of 4" or 6" chemical light sticks. The Dispenser is manufactured from impact resistant polymeric material, so the Dispenser 100 is durable and will withstand the harsh elements of a tactical environment. The Dispenser 100 is extremely fast to activate, using only one hand. Importantly, the Dispenser 100 is lifesaving in nature, as it eliminates the possibility of an accidental broken chemical light hanging from the body of a law enforcement officer or similar occupation inside of a dangerous, tactical operation.

What I claimed is:

1. A tactical chemical light stick dispenser comprising a dispenser housing, loading index points connected to an assist rod, a light stick status window, an upper raised finger block, a light stick ejection port located at the bottom of the dispenser housing, a lower raised finger block, an actuating plunger, an actuating button, and an actuating rod, wherein the ends of a bottom most light stick are held in place by the dispenser housing, wherein pressure from the actuating button, through the actuating rod provides a perpendicular force to the middle of the bottom most chemical light stick, causing a bend and resulting in breaking the internal chemical chambers of the bottom most light stick and activating the chemical light stick.

2. The tactical chemical light stick dispenser described in claim 1 comprising one side of the dispenser housing forms forming the chemical light stick status window that permits viewing of the number of remaining chemical light sticks for ejection.

3. The tactical chemical light dispenser described in claim 1 comprising the chemical light stick housing vertical spring maintaining downward pressure on the vertical spring follower, which in turn, applies downward pressure on the chemical light sticks in the dispenser that holds the light sticks in place down the dispenser housing all the way to the bottom of the light stick ejection chamber.

4. The tactical chemical light dispenser described in claim 1 comprising when the actuating button is depressed, the inward pressure caused by the actuating rod springs forces a chemical light stick to bend across the forward moving actuating rod causing the bottom most chemical light stick to become broken and the chemicals in the bottom most light stick to be activated.

5. The tactical chemical light stick dispenser described in claim 1 comprising the actuating button, plunger, and actuating rod forces the bottom most activated chemical light stick to eject from the ejection chamber and out through the chemical light stick ejection port and the actuating springs restore the actuating button back to the original ready position.

6. The tactical chemical light stick dispenser described in claim 1 comprising a light stick loading port, the actuating button is connected to and transitions into an actuating plunger which in turn is connected to and transition into an actuating rod, and two actuating rod springs maintaining pressure against the actuating plunger outwards from the device.

7. The tactical chemical light stick dispenser described in claim 1 comprising within the dispenser housing a chemical light stick housing, a vertical spring chamber, a chemical light stick housing vertical spring, a vertical spring follower, a chemical light stick housing loading port, and a chemical light stick loading assist rod with the loading index points.

8. The tactical chemical light stick dispenser described in claim 7 comprising one side of the dispenser housing forms the chemical light stick status window that permits viewing of the number of remaining chemical light sticks for activation and ejection.

9. The tactical chemical light stick dispenser described in claim 8 comprising the chemical light stick housing, wherein the chemical light stick housing vertical spring exerts downward pressure on the chemical light sticks in the dispenser which pushes and cycles the next chemical light stick into position for subsequent activation and ejection.

10. The tactical chemical light stick dispenser described in claim 9 comprising the chemical light stick housing, the chemical light stick housing vertical spring that maintains downward pressure on the vertical spring follower, which in turn, applies downward pressure on the chemical light sticks in the dispenser that holds the light sticks in place down the dispenser housing all the way to the bottom of the chemical light stick ejection chamber.

11. The tactical chemical light stick dispenser described in claim 10 comprising when the actuating button is depressed, the bottom most chemical light stick breaks and the chemicals in the bottom most light stick activate.

12. The tactical chemical light stick dispenser described in claim 11 comprising that once the bottom most chemical light stick is activated, the actuating button, plunger, and actuating rod forces the bottom most chemical light stick to eject from the ejection chamber and out through the chemical light stick ejection port and the actuating springs restore the actuating button back to the original ready position.

13. The tactical chemical light stick dispenser described in claim 12 comprising within the dispenser housing a chemical light stick housing vertical spring chamber, a chemical light stick housing vertical spring, a vertical spring follower, a chemical light stick housing loading port, and a chemical light stick loading assist rod with the loading index points.

* * * * *